United States Patent [19]
Heiska et al.

[11] Patent Number: 6,021,316
[45] Date of Patent: Feb. 1, 2000

[54] METHOD AND APPARATUS FOR DETERMINING PATH ATTENUATION OF RADIO WAVES

[75] Inventors: Kari Heiska, Helsinki; Arto Kangas, Espoo, both of Finland

[73] Assignee: Nokia Telecommunications Oy, Espoo, Finland

[21] Appl. No.: 09/000,337

[22] PCT Filed: May 20, 1997

[86] PCT No.: PCT/FI97/00294

§ 371 Date: Jan. 20, 1998

§ 102(e) Date: Jan. 20, 1998

[87] PCT Pub. No.: WO97/44977

PCT Pub. Date: Nov. 27, 1997

[30] Foreign Application Priority Data

May 22, 1996 [FI] Finland ..................................... 962166

[51] Int. Cl.[7] .................................................. H04B 17/00
[52] U.S. Cl. .......................... 455/67.6; 455/446; 455/504
[58] Field of Search ............................... 455/67.1, 67.6, 455/67.5, 504, 506, 10, 446, 449, 422, 423; 342/359, 360; 702/127, 159

[56] References Cited

U.S. PATENT DOCUMENTS 5,450,615  9/1995  Fortune et al. ......................... 455/67.6
5,574,466  11/1996  Reed et al. .............................. 342/359

OTHER PUBLICATIONS

C. Bergljung et al, "IEEE Global Telecommunications Conference GLOBECOM'91, vol. 2" Rigorous diffraction theory applied to street microcell . . ." ", 1991, pp. 1292–1296.

Proceeding of the IEEE, vol. 82, No. 9, Sept. 1994, (.), Henry L. Bertoni et al, "UHF Propagation Prediction for Wireless Personal Communications " pp. 1333–1359.

IEEE Transactions on Vehiculartechnology, vol. 43, No. 3, Aug. 1994, (.), Martin J. Feuerstein et al, "Path Loss, Delay Spread, and Outage Models as Functions of Antenna Height for Microcellelar System Design " pp. 487–498.

Schaubach et al., A ray tracing method for predicting path loss and delay spread in microcellular environments, IEEE, Feb., pp. 932–935.

*Primary Examiner*—Lee Nguyen
*Attorney, Agent, or Firm*—Pillsbury Madison & Sutro

[57] ABSTRACT

A method and apparatus for determining path attenuation of radio waves in a radio system, in which at least a two-dimensional vector map describing the environment of a base station is used for determining the coverage area of the base station of the system, and in which the strength of the emission of a transmitter is determined at various points in the environment. The invention is implemented by calculating from the base stations environment described by the vector map a polygon area to which radio waves can propagate both directly and by means of diffraction and reflections, by estimating the strength of the emission of the transmitter at each location point of the transmitter to be examined in the polygon area determined by calculation, and by determining points of the polygon area in advance, storing the determined points in a memory, and reading the stored points from the memory for calculating the polygon area for different location points of the transmitter.

8 Claims, 4 Drawing Sheets

METHOD AND APPARATUS FOR DETERMINING PATH ATTENUATION OF RADIO WAVES

FIELD OF THE INVENTION

The present invention relates to a method for determining path attenuation of radio waves in a radio system, in which method at least a two-dimensional vector map describing the environment of a base station is used for determining the coverage area of the base station of the system, and in which the strength of the emission of a transmitter is determined at various points in the environment.

The invention further relates to an apparatus for determining path attenuation of radio waves in a radio system comprising at least one base station, and which apparatus comprises means for maintaining at least a two-dimensional vector map describing the environment of a desired base station, and means for determining the strength of the emission of a transmitter at various points in the environment.

BACKGROUND OF THE INVENTION

When building up a radio system, the desired coverage area is to be attained with as low costs as possible. When the locations of the base stations of the system are considered, both the required traffic capacity and the coverage area to be attained are taken into account. The base stations tend to be placed so that the coverage area to be attained is great and the base station is situated in a preferable location for the propagation of radio waves. For this purpose, there are various methods and auxiliary means in radio network planning. Vector maps to which the terrain and building information of a desired area is mapped are generally used as auxiliary means in radio network planning. By means of a vector map, with the help of a computer, coverage areas and parameters associated with the operation of the network can be calculated for various locations of base stations.

The present invention can be applied to cellular radio networks especially in an environment having many buildings where the radio network is realized by means of microcells. Microcelis refer to cells considerably smaller in size than conventional cells in the cellular radio system. Microcells are typically used in the city centres where a lot of traffic capacity is needed.

When path attenuation of a radio wave is calculated in the micro cell environment, the propagation mechanisms are generally divided into diffraction, reflections, scattering and direct wave. When this kind of a deterministic propagation model is used in radio network planning, the problem will be the length of time spent for calculation.

For example, multiple diffraction is calculated slowly because there will be very many different combinations of connections between corners even in simple building maps. The method of double diffraction is generally used in the propagation model calculation where the corners visible to the transmitter are examined. It is tested at each corner which calculation points are in the line of vision of the corner. The diffraction field of this corner is calculated therein. It is further tested which corners are in the line of vision of this corner and these corners and calculation points in the line of vision of the corners are examined. The method is very slow as it has to be calculated at each calculation point if there is visibility to the corner to be diffracted. If there are many calculation points, in grid maps generally ($10^6$–$10^7$), the visibility check of each point to every corner to be diffracted is a very laborious operation.

A corresponding situation also occurs when calculating reflections. A so-called ray-tracing method is used for calculating multiple reflections. Ray-tracing can be carried out in two ways: by means of multiple mirror images or by means of a ray launching method.

The problem with determining multiple reflection routes by means of mirror images is that the number of different wall combinations and mirror images is generally very high and the required calculation is arduous and slow. Similarly, the calculation capacity required for the ray launching method is great and the method is also inaccurate.

CHARACTERISTICS OF THE INVENTION

The object of the present invention is to accomplish a method and an apparatus by means of which the disadvantages of prior art methods can be obviated. The object of the invention is to achieve a method for calculating the coverage area of the base station in such a manner that the required amount of calculation is considerably smaller than in prior art methods. The purpose of the invention is to provide a method for calculating the coverage area of a base station fast and advantageously.

This will be attained with the method as shown in the preamble which is characterized by calculating from the calculation area described by the vector map a polygon area to which radio waves can propagate both directly and by means of diffraction and reflections, and by estimating the strength of the emission of the transmitter at each location point of the transmitter to be examined in the polygon area determined by calculation.

The apparatus of the invention is characterized in that the apparatus further comprises means for calculating from the calculation area described by the vector map a polygon area to which radio waves can propagate both directly and by means of diffraction and reflections, and means for estimating the strength of the emission of the transmitter at each location point of the transmitter to be examined inside the determined polygon area.

The solution of the invention has many advantages. The great amount of calculation required by known methods can be diminished by restricting the area of the vector map only to those areas on which the radio waves can propagate. The method makes calculation many times faster. The acceleration of calculation is very significant for radio network planning where the received power is calculated on the vector map which can easily be transferred to a computer display, for example. In network planning, the exact location of the base station and the features of the system are selected on the basis of-the calculated result. Network planning is often an iterative process where the position of the base station is changed many times to achieve the desired result. By means of exact and fast calculation, the costs of network planning can be decreased and the efficiency of planning increased.

BRIEF DESCRIPTION OF THE FIGURES

In the following, the invention will be explained in more detail by means of the appended drawings, wherein.

BRIEF DESCRIPTION OF THE INVENTION

Figure 1:
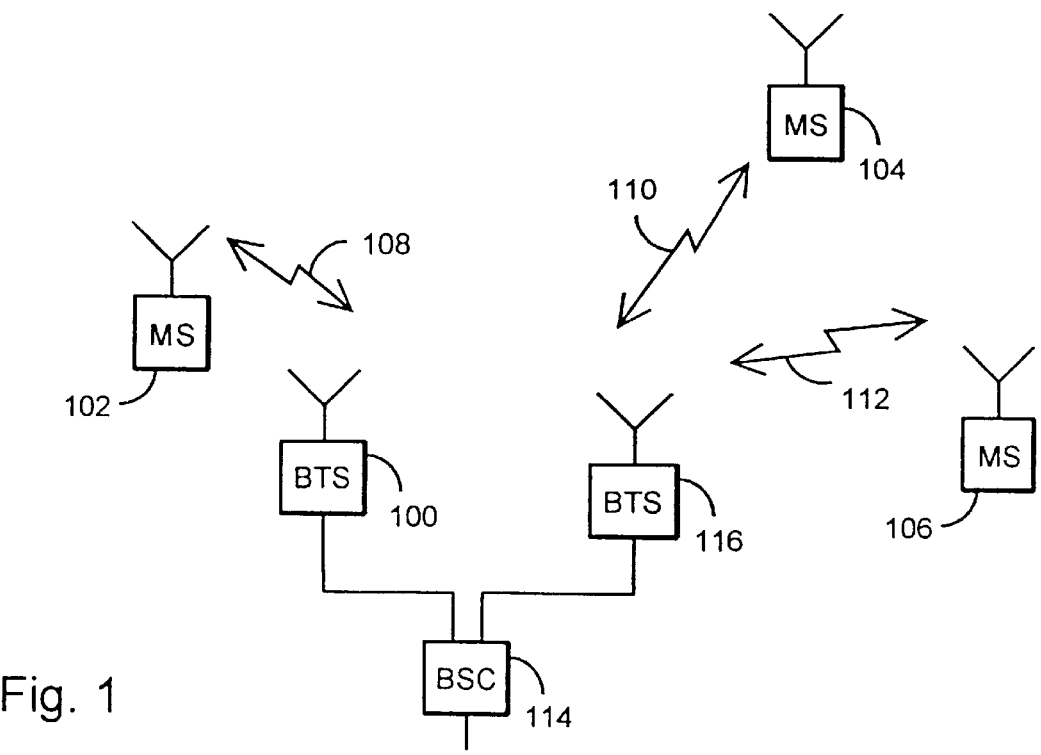
FIG. 1 shows an example of a radio system to the planning of which the method of the invention can be applied.

The method of the invention can hence be applied preferably to radio network planning. It is especially suitable for planning radio systems which are accomplished with microcell technique in a town environment. The structure of one typical radio system is described by way of example with relevant parts in FIG. 1. The system comprises a set of base stations 100, 116 and a set of generally mobile subscriber terminal equipments 102 to 106 which have a bidirectional connection 108 to 112 to some base station 100, 116. The base stations 100, 114 transmit the connections of the terminal equipments 102 to 106 to a base station controller 114 that forwards them to other parts of the system and to the fixed network. The base station controller 114 controls the operation of one or more base stations 100, 116. In network planning, the base stations 100, 116 are placed as preferably as possible in such a way that the coverage area of each base station can be maximized, but so that the required traffic capacity will be attained.

A schematic structure of a cellular radio system accomplished with the microcell technique in a town environment is as shown in FIG. 1, but a heavily built environment will set its own restrictions on the placing of base stations and radio wave propagation. The propagation possibilities of a direct signal are restricted and the effect of diffractions and reflections on the propagation of radio waves is essential.

Figure 2:
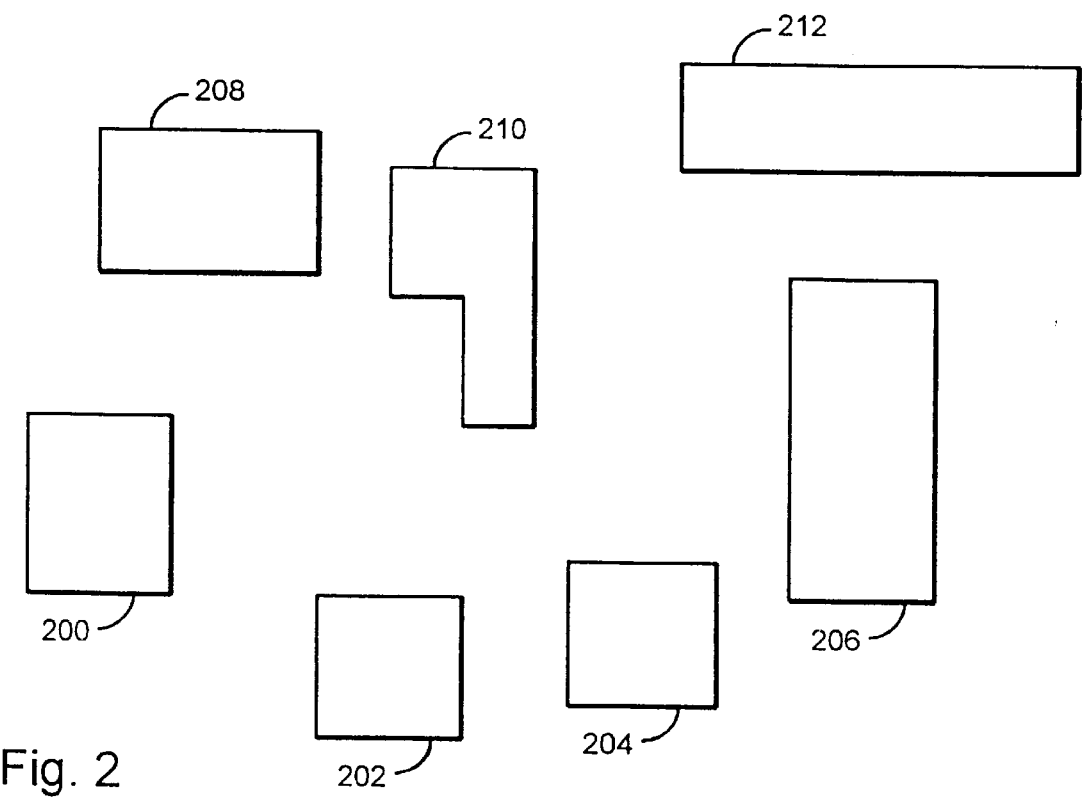
FIG. 2 illustrates an exemplary part of a vector map of a town area.

Vector maps to which the terrain and building information of the desired area are mapped are used as auxiliary means in network planning. By means of a vector map, with the help of a computer, coverage areas and propagation parameters are calculated for different locations of base stations and on the basis of these calculations, the most preferred positions of base stations are selected. FIG. 2 illustrates by way of example a part of a vector map of a town area. The vector map describes the buildings of the area to be examined with the desired accuracy, either specifically for each building or for each block on maps with a larger scale. The map of FIG. 2 comprises seven buildings 200 to 212.

In network planning there is an iterative process in which the base station is placed in various locations and the coverage area of the base station is determined for each location point. With the solution of the invention, the calculation of the coverage area can be greatly accelerated by restricting calculation only to those areas to which a radio wave really propagates with the help of reflections and diffraction. For each location point of the base station transmitter to be examined, a polygon area is restricted from the calculation area described by the vector map, radio waves being able to propagate to the polygon area both directly and by means of diffraction and reflections. The strength of the emission of the transmitter is determined only inside the calculated polygon area.

Figure 3A:
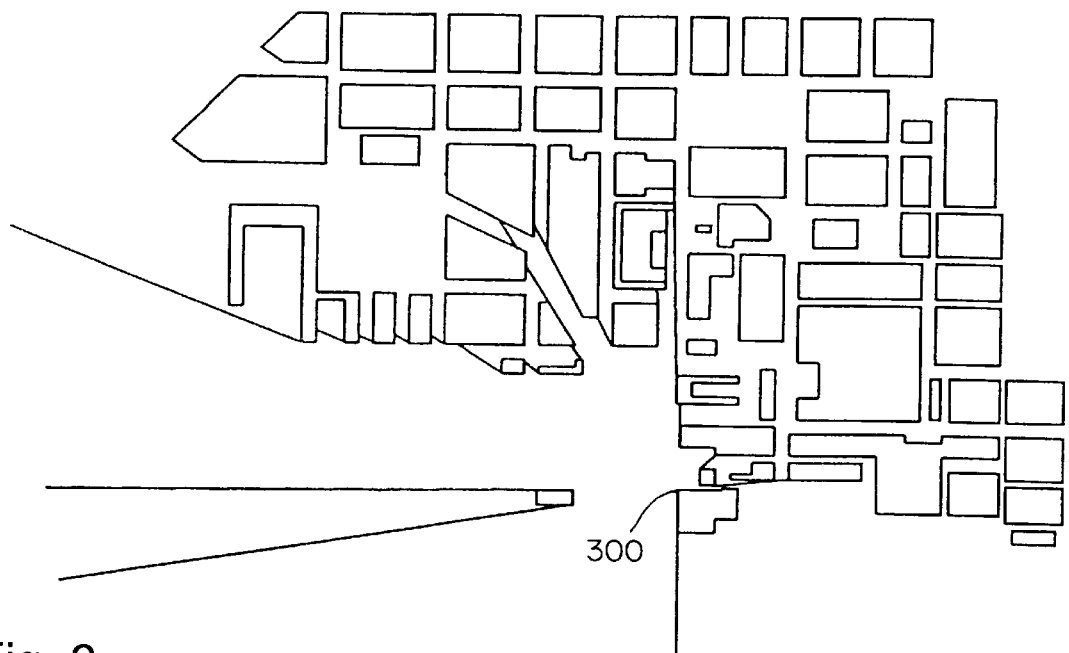
FIGS. 3a and 3b illustrate an example of calculating diffractions.
Figure 3B:
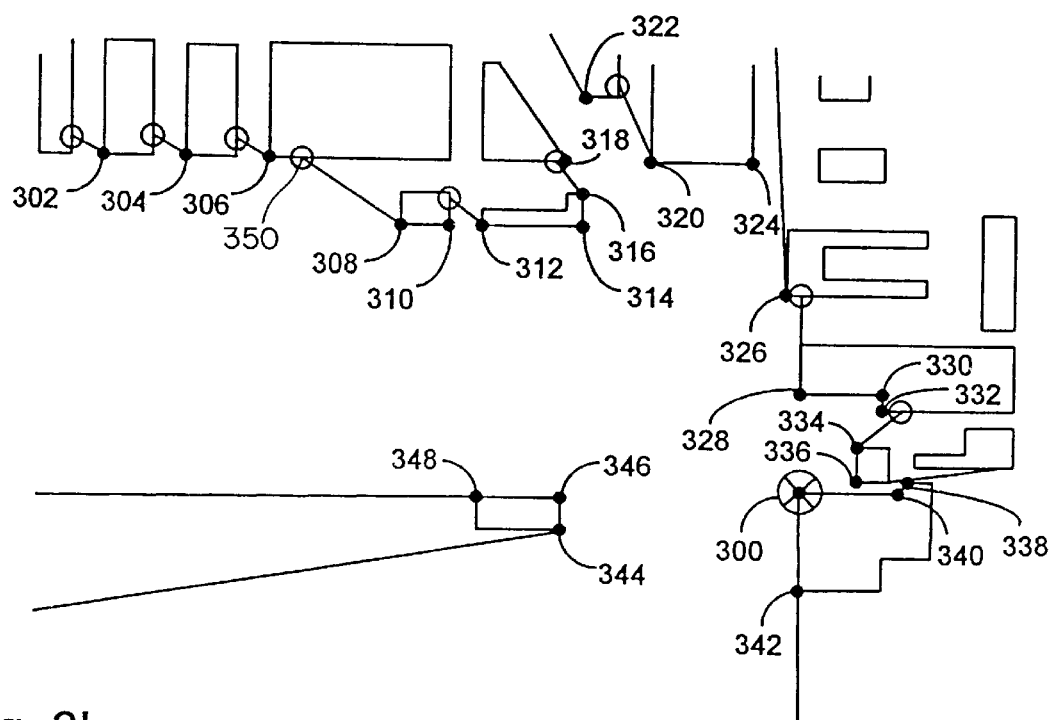

The calculation of diffraction is examined first. In the method of the invention, when the polygon area is determined, all the corners of buildings visible to the transmitter are examined, and if both sides of the corner to be examined are visible to the transmitter, the corner is taken as a corner included in the polygon as such, and if only one of the sides of the corner to be examined is visible to the transmitter, the intersection of the wall behind the corner and the corner is taken into the polygon, as well. FIG. 3a shows a vector map describing a town area. It is assumed that a corner 300 is visible to the base station. The diffraction polygon of the corner 300 is indicated in the map. If the corner 300 is visible to the transmitter, the diffraction from the corner 300 is calculated to the points inside the polygon shown in the figure. The immediate environment of the corner 300 is shown magnified in FIG. 3b. The polygon to be determined is formed of visible corners 302 to 348 of the corner 300 and the intersections behind them. The intersections are indicated in the figure with small circles.

The corner points visible from the corner 300 are thus used as supply information in calculating a polygon. The polygon can be determined by going through the corners 302 to 348 in order. If both sides of some corner are visible to the corner, the corner is included in the polygon as such. In the figure the corner 314, for example, is such a corner. If only one side is visible from some corner, the intersection of the wall behind the corner and the corner are taken into the polygon. In the figure this kind of a corner is a corner 308 where an intersection 350 is included. In general, the polygon is formed in practical cases of about 20 to 150 corner points. These points of the polygon are stored in memory. When the diffraction of some specific corner is calculated, this polygon is taken from memory and it is checked which points are inside this polygon and the diffraction is calculated to these points only. When using the method, it is not necessary to check if the corner in question is visible to the calculation point as it is known that all the points inside the polygon are visible to the corner.

The search for the points that are inside the polygon is quite uncomplicated, and fast algorithms known to those skilled in the art have been developed for the purpose.

The calculation of reflections is examined next. In the method of the invention, when a polygon area is determined, a mirror image of the location of the transmitter with respect to the wall surface visible to each transmitter is calculated, and that a sector restricted by the wall surface to be examined from the location of the mirror image is taken as an area included in the polygon. The procedure is repeated recursively a desired number of times for the wall surfaces visible to the sector restricted by the wall surface to be examined from the location point of the mirror image.

Figure 4:
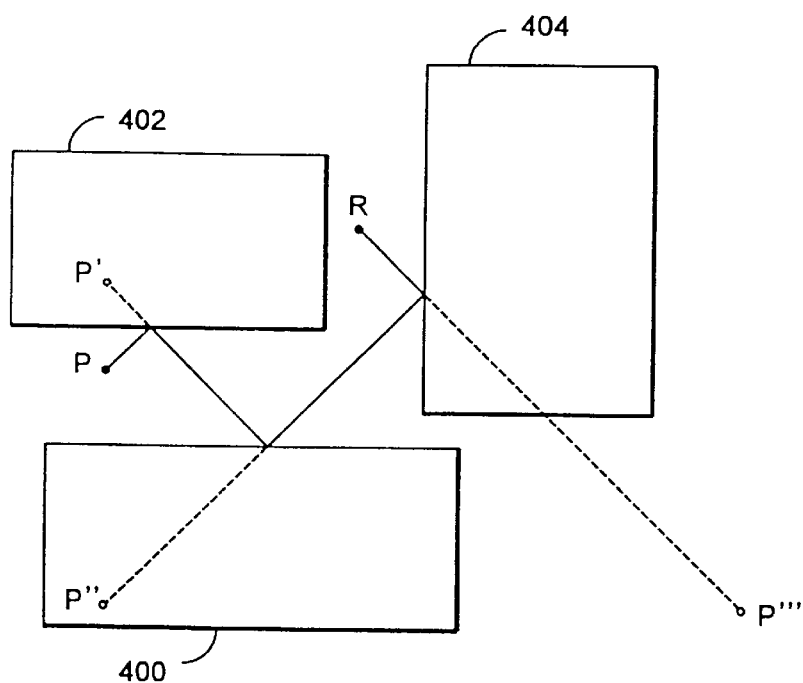
FIG. 4 illustrates an example of calculating reflections by the mirror image principle.

FIG. 4 illustrates the calculation of multiple reflections with the mirror image principle. The figure shows three buildings 400 to 404, a transmitter P and a receiver R. The source point P is mapped via assumed reflection surfaces to image points. After this it is examined if the route in question exists, that is, if the ray can go to the destination along a route calculated in this way. In the figure reflection points P', P" and P'" are obtained by means of reflection surfaces via which point the ray will advance to the receiver. By moving the receiver to different points, it is possible to detect when the route is not found.

Another known method used in the calculation of reflections is the ray launching method. The movement of a ray from a transmitter is followed, and if it meets a wall, the reflected ray will be calculated and it will be followed to the subsequent reflection point, and so on. Rays are sent from the transmitter at a distance of a specific angle difference. The generally used angle difference is 0.1°, in which case there will be 3,600 rays per point. At the reception point it is calculated which rays will read from the vicinity of this point. If the ray moves closer than 3 metres to the reception point, it can be assumed that the ray in question will attain the reception point. All the rays progressing via different routes attaining the reception point are taken into consideration. After this the calculation of the next reception point will be started.

In the method of the invention, the two methods described above are combined and a fast and accurate method for calculating reflections will be obtained as a result. In the method, rays forming a sector in each starting and end point of the part of the wall visible from the transmitter are calculated. By means of the rays, the rays reflected from the wall surface are further calculated by means of a mirror image of the transmitter. Then a new sector is formed where the image point of the transmitter is the starting and end point and the reflected rays sides. The sector is also restricted by the new parts of the wall encountered by the wave reflected from the wall, which parts are starting points for new reflection sectors. The sector and the walls of houses restricting it form a polygon, that is, a reflection polygon to each point of which can be calculated a reflection field via the walls known now. In this way it is possible to calculate a reflection field at the same time for large areas by calculating just once the image points with known walls. The method will accelerate the calculation of reflection fields of even large areas especially when more reflections are to be calculated. The developed method is also definitely accurate both near to and far from the transmitter.

Figure 5:
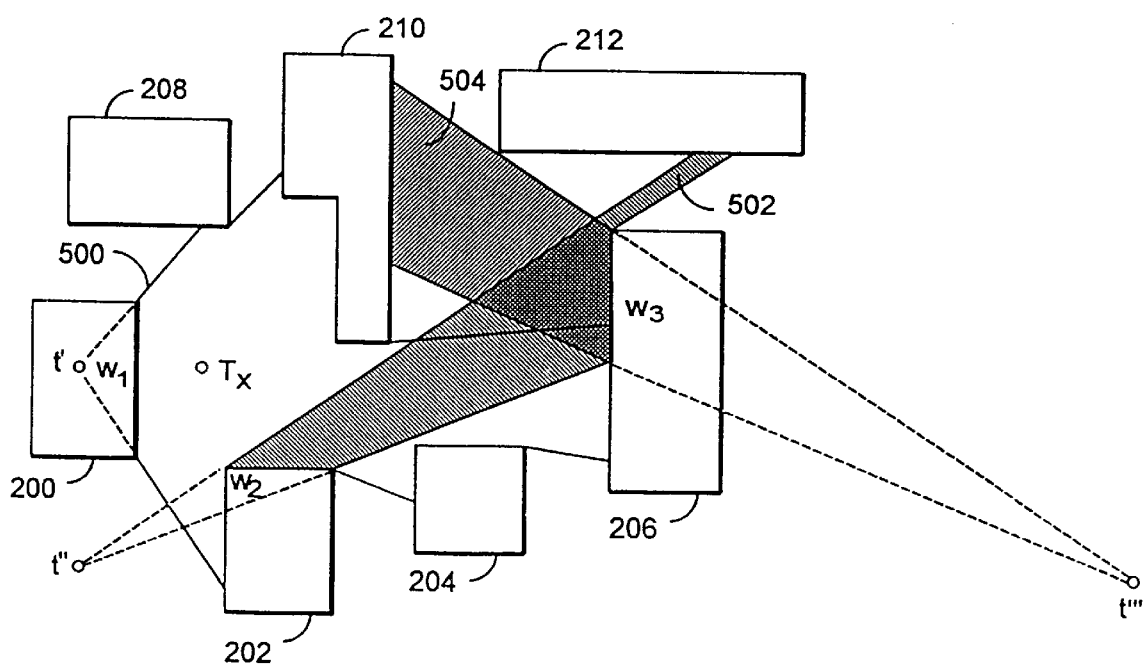
FIG. 5 illustrates an example of the solution of the invention for calculating a reflection polygon.

FIG. 5 illustrates the method of the invention described above. In the figure, the transmitter is situated at point T. First, the sector 500, which forms the ray reflected from a wall surface $W_1$ of the building 200, is calculated by means of a mirror image t' of the transmitter. Next by means of a mirror image t", a sector 502 reflected further from a wall surface $W_2$ of the building 202 is calculated, the sector being indicated with oblique lines in the figure. By means of a mirror image t'", a sector 504 reflected from a wall $W_3$ of the building 206 is also calculated, the sector being indicated with vertical lines in the figure. The corresponding reflection calculations are carried out for all wall surfaces. In this example, triple reflection is described by way of example.

A reflection field can now be calculated for each point of the reflection polygon via the walls known now. As was stated earlier, the search for the points that are inside the polygon is quite uncomplicated, and fast algorithms known to those skilled in the art are developed for the purpose.

In the method of the invention, it is easy to combine diffraction and reflection calculation method described above in such a manner, for example, that reflection is calculated first and diffraction after it or first diffraction and then reflection.

Figure 6:
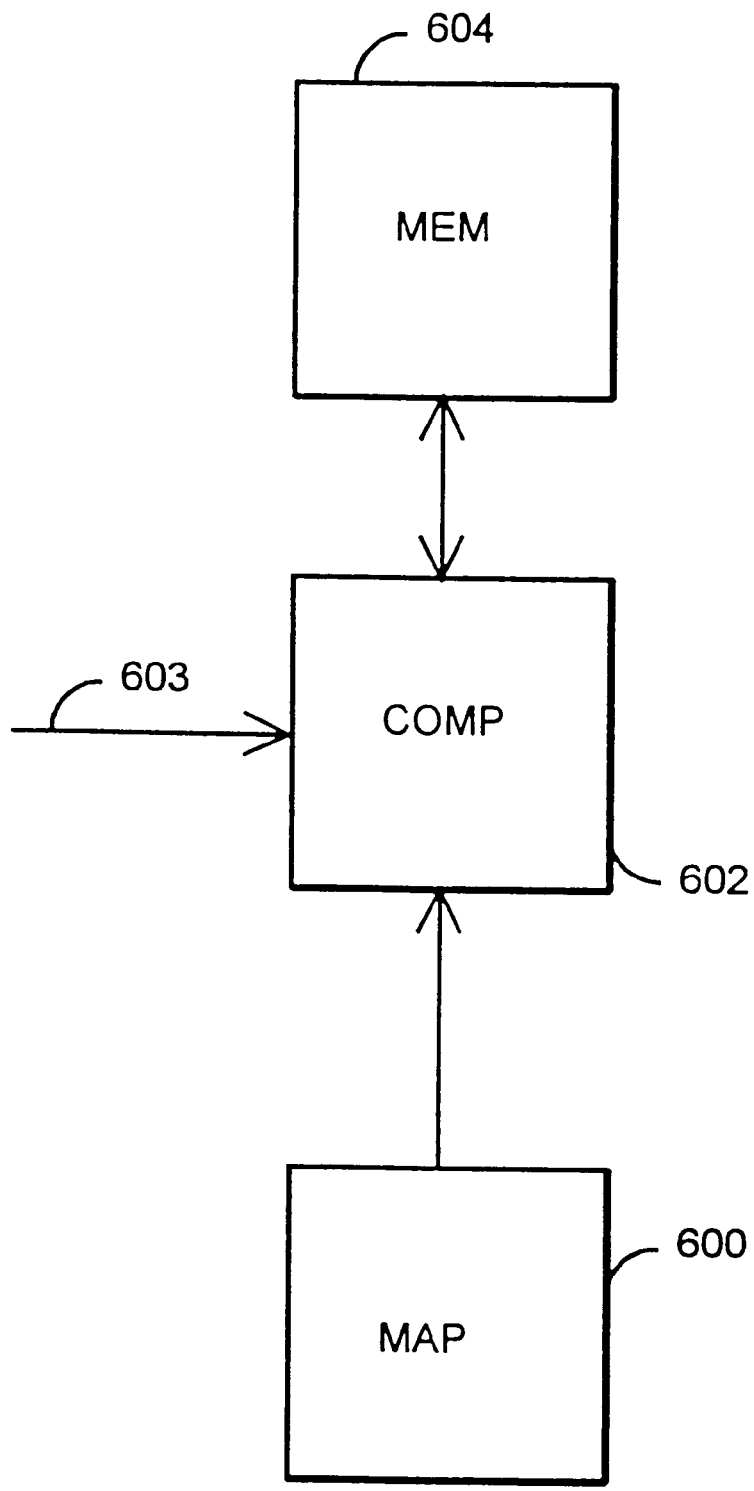
FIG. 6 illustrates the structure of the apparatus of the invention on the block diagram level.

In the following, the structure of the apparatus accomplishing the method of the invention will be examined by means of a block diagram shown in FIG. 6. The apparatus comprises means 600 for maintaining at least a two-dimensional vector map describing the environment of the desired base station. The means 600 are typically realized by means of memory circuits. The apparatus further comprises processor means 602 for determining the strength of the emission of the base station transmitter at various points in the environment. The apparatus of the invention further comprises computation means 602 for determining a polygon area from the calculation area described by the vector map, radio waves being able to propagate to the polygon area both directly and by means of diffraction and reflections, as in the above-described method, and means 602 for estimating the strength of the emission of the transmitter at each location point of the transmitter to be examined within the determined polygon area. Each location point of the transmitter under calculation can be conveyed as an input 603 to the processor means. The means 602 can be preferably realized by means of a microprocessor or a similar detached logic circuit, in which case the procedures of the invention can preferably be realized by means of software.

As was described above, the vector map can comprise the outer edges of the buildings comprised in the environment of the base station. In that case the apparatus realizing the method of the invention comprises the means 602 for calculating the diffraction field for each corner 300 of the buildings in such a manner that the calculation is carried out for the corners 302 to 348 visible to said corner 300 and if both sides of the corner being examined are visible to the corner 300 to be calculated, the corner to be examined is taken as a corner included in the polygon as such, and if only one of the sides of the corner to be examined is visible to the corner 300 to be calculated, the intersection of the wall behind the corner to be examined and the corner is also taken into the polygon.

By means of one preferred embodiment, the processor means 602 of the apparatus realizing the method of the invention calculate polygon points for each corner point in advance. The memory means 604 store the points for calculation. The processor means 602 read the points from a memory when the coverage area is calculated for different location points of the transmitter.

Although the invention is explained above with reference to the example of the accompanying drawings, it is evident that the invention is not restricted thereto, but it can be modified in various ways within the inventive idea disclosed in the appended claims.

We claim:

1. A method for determining path attenuation of radio waves in a radio system, in which method at least a two-dimensional vector map describing the environment of a base station is used for determining the coverage area of the base station of the system, and in which the strength of the emission of a transmitter is determined at various points in the environment, characterized by calculating from the base stations environment described by the vector map a polygon area to which radio waves can propagate both directly and by means of diffraction and reflections, by estimating the strength of the emission of the transmitter at each location point of the transmitter to be examined in the polygon area determined by calculation, and by determining points of the polygon area in advance, storing the determined points in a memory, and reading the stored points from the memory for calculating the polygon area for different location points of the transmitter.

2. A method according to claim 1, characterized in that the vector map describes the outer edges of the buildings comprised in the environment of the base station, and that when determining the polygon area, the corners of the buildings visible to the transmitter are examined, and when calculating a diffraction field for a selected corner (300), other corners (302–348) visible to the selected corner (33) are examined, and if both sides of one of the other corners to be examined are visible to the selected corner (300) to be calculated, the one of the other corners to be examined is taken as a corner included in the polygon as such, and if one of the sides of the one of the other corners to be examined is visible to the selected corner to be calculated, the intersection of the wall behind the one of the other corners and the one of the other corners is also taken into the polygon.

3. A method according to claim 2, characterized in that the points of the polygon area that are determined in advance are points representing the selected corner and the other corners.

4. A method according to claim 1, characterized in that the vector map describes the outer edges of the buildings comprised in the environment of the base station, and that when determining the polygon area, a mirror image (t') is calculated for the location of the transmitter with respect to each wall surface ($W_1$) visible from the transmitter (T), and that a sector (500) restricted by the wall surface to be examined from the location of said mirror image is taken as an area included in the polygon.

5. A method according to claim 4, characterized in that the procedure is repeated recursively a desired number of times for wall surfaces (W2, W3) visible to the sector restricted by the wall surface to be examined from the location of said mirror image (t', t'').

6. An apparatus for determining path attenuation of radio waves in a radio system comprising at least one base station, and which apparatus comprises means (600) for maintaining at least a two-dimensional vector map describing the environment of a desired base station, and means (602) for determining the strength of the emission of a transmitter at various points in the environment, characterized in that the apparatus further comprises means (602) for calculating from the base station environment described by the vector map a polygon area to which radio waves can propagate both directly and by means of diffraction and reflections, means (602) for estimating the strength of the emission of the transmitter at each location point of the transmitter to be examined inside the determined polygon area, and means for determining points of the polygon area in advance, means for storing the determined points in a memory and means for reading the stored points from the memory for calculation of the polygon area in said means for calculating for different location points of the transmitter.

7. An apparatus according to claim 6, characterized in that the apparatus comprises means (602) for maintaining a map of the outer edges of the buildings comprised in the environment of the base stations, and means (602) for calculating a diffraction field for a selected corner (300) of the buildings in such a manner that the calculation is carried out for other corners (302–348) visible to the selected corner (300) and if both sides of the one of the other corners being examined are visible to the selected corner (300) to be calculated, the one of the other corners to be examined is taken as a corner included in the polygon as such, and if only one of the sides of one of the other corners to be examined is visible to the selected corner (300) to be calculated, the intersection of the wall behind the one of the other corners to be examined and the one of the other corners is taken into the polygon.

8. An apparatus according to claim 6, characterized in that the points of the polygon area that are determined in advance are points representing the selected corner and the other corners.

* * * * *